United States Patent [19]
Gorbaty et al.

[11] Patent Number: 5,336,705
[45] Date of Patent: Aug. 9, 1994

[54] POLYMER-MODIFIED, OXIDIZED ASPHALT COMPOSITIONS AND METHODS OF PREPARATION

[75] Inventors: Martin L. Gorbaty, Westfield; Nicholas C. Nahas, Chatham, both of N.J.

[73] Assignee: Exxon Research and Engineering Company, Florham Park, N.J.

[21] Appl. No.: 41,072

[22] Filed: Apr. 1, 1993

Related U.S. Application Data

[63] Continuation-in-part of Ser. No. 846,366, Mar. 5, 1992, abandoned.

[51] Int. Cl.$^5$ ............................................. C08L 95/00
[52] U.S. Cl. ........................................ 524/68; 524/69; 524/70; 524/71; 525/314
[58] Field of Search .................. 524/68, 69, 70, 71; 525/314

[56] References Cited

U.S. PATENT DOCUMENTS

| | | | |
|---|---|---|---|
| 3,642,728 | 2/1972 | Canter | 525/341 |
| 4,497,921 | 2/1985 | Chang et al. | 524/70 |
| 4,617,227 | 10/1986 | Weaver | 524/69 |

Primary Examiner—Paul R. Michl
Assistant Examiner—Olga Asinovsky
Attorney, Agent, or Firm—Linda M. Scuorzo

[57] ABSTRACT

Disclosed in this invention are novel road paving asphaltic compositions having improved viscoelastic properties and storage stability and unexpected phase compatibility. They contain neutralized mixtures of oxidized asphalt and an acid functionalized polymer, which polymer is selected from the group consisting of sulfonated EPDM, sulfonated styrene-butadiene, and acrylic acid terpolymers, in an amount that is sufficient to result in an asphaltic composition having a softening point greater about 55° C. and a viscosity in the range from about 150 cPs to 2000 cPs or from about 3000 cPs to about 8000 cPs at 135° C. and effective to allow the formation of one continuous phase or two interdispersed phases that do not segregate on standing at elevated temperatures. The basic neutralizing agent used in these compositions contain cations having a valence of from +1 to +3, preferably +2. The invention also relates to the products produced by the process and method of making the compositions. The compositions can be used as a binder in paving applications, particularly as a binder in dense graded and in open graded hot mix pavements.

11 Claims, No Drawings

POLYMER-MODIFIED, OXIDIZED ASPHALT COMPOSITIONS AND METHODS OF PREPARATION

This is a continuation-in-part of U.S. application No. 846,366 filed Mar. 5, 1992, now abandoned.

BACKGROUND OF THE INVENTION

1. Field of the Invention

The present invention relates to asphaltic compositions having viscoelastic properties that are suitable for use as binders in dense graded and open graded hot mix asphalt pavement. The compositions comprise blends of asphalt or bitumen and synthetic polymers which are storage stable between the time of preparation and the time of use in hot mix pavement. The present invention also relates to methods of preparing and methods of using the compositions and the products produced by the process of the present invention.

2. Discussion of Related Art

Asphalt has certain physical properties that vary widely with changes in temperature. For this reason, polymers often are added to asphalt to extend the range of its physical properties. Polymers can reduce the tendency of the asphalt to creep and rut in warm weather by increasing its high temperature viscoelastic stiffness; typical paving grade asphalts have softening points below 50° C., while softening points greater than 55° C. are desired for resistance to creep in hot weather; and polymers can minimize cracking and stripping in cold weather by improving the asphalts low temperature viscoelastic properties.

Not all asphalts and polymers form compatible mixtures having storage stability. The storage stability of polymer modified asphalt is greatly affected by the compatibility of the asphalt with the particular polymer. Incompatible and partially compatible mixtures easily undergo phase separation.

Furthermore, some polymer modified asphalts are suitable for roofing applications but cannot be used in hot mix paving applications where the blend must be sufficiently fluid at mixing temperature to adequately coat the aggregate particles. For example, an asphalt binder for dense graded hot mix paving should have a viscosity at 135° C. between 150 and 2000 cPs, and a binder for open graded hot mix should have a viscosity at 135° C. between 3000 and 8000 cPs.

Various methods have been suggested for making polymer-modified asphalt compositions that are sufficiently compatible to be acceptably storage stable and that also have viscosities and softening points in the range required for a particular type of application. Some, for example, rely on selection of the appropriate polymer and other additives and require a specific sequence of blending and reaction steps to effect the final properties of the asphalt-polymer mixture (see, for example, U.S. Pat. No. 4,600,635 for use of a bitumen-based adhesive composition comprising bitumen, oil, and an ionomeric elastomer (such as sulfonated, carboxylated or phosphonated EPDM or butyl rubber) in less than 15% weight, preferably 3%–8%, that is neutralized by metal cations; British Patent No. 1,534,183 discloses inter alia use of a metal alcoholate and the addition of from 5% to 95% wt. of an ethylene/vinyl ester copolymer and bitumen partially crosslinked by means of —O—M—O—, —O—B—O— or —O—CRR'—O— bridges; or U.S. Pat. No. 4,882,373 for acid modification of asphalt with subsequent contact with an oxygen-containing gas, and mixing with a thermoplastic elastomer, and an unsaturated functional monomer.)

These examples require specific chemicals and/or processing steps not required by the present invention.

U.S. Pat. No. 4,371,641 teaches that a polymer, preferably an unsaturated elastomer, e.g., EPDM or butyl rubber, or a thermoplastic polymer (from 5–25 wt %) and an appropriate filler can be added to airblown asphalt to make it suitable for use as a roofing material by increasing the asphalt's stability towards oxidation and decreasing its sensitivity to ultraviolet radiation. The thermoplastic or elastomeric polymer must contain anionic groups such as carboxylate, phosphonate or, preferably, sulfonate groups which can be neutralized by addition of a salt of a carboxylic acid, preferably a metal acetate, more preferably zinc acetate. Applicants have found that the weight percents of polymer specified in this disclosure produce blends that are too viscous to coat the aggregate in hot mix paving materials.

Accordingly, none of the foregoing references teaches nor suggests the road paving asphaltic compositions having the storage stability (as evidenced by appropriate softening points of the blends and by lack of phase segregation between the asphalt and polymer phases) and viscoelastic properties over a wide range of temperatures required to produce a superior binder for dense graded and open graded hot mix asphalt for road paving applications that is disclosed by the applicants, nor does any teach nor suggest the process of preparing or using applicants' composition.

SUMMARY OF THE INVENTION

This invention relates to road paving polymer modified asphaltic compositions that are storage stable and have viscoelastic properties over a wide range of temperatures that make them suitable for use as superior binders for dense graded and open graded hot mix asphalt for road paving applications. Unexpectedly polymer and asphalt blends that are normally incompatible (i.e. segregate on standing) can be made into compatible blends according to the present invention. Thus the compositions are those in which the polymer and asphalt phases are uniformly to substantially uniformly (inter)dispersed throughout the neutral blend and do not segregate on standing at elevated temperatures (although they may phase separate as further described herein). The compositions comprise neutral mixtures or blends of oxidized asphalts and acid functionalized polymers, such as acrylic acid terpolymers and sulfonated unhydrogenated styrene-butadiene and styrene-butadiene-styrene and sulfonated EPDM, the mixtures having softening points greater than 55° C. and viscosities measured at 135° C. in a range from about 150 to about 2000 cPs for dense graded pavement or from about 3000 to 8000 cPs for open graded pavement, and wherein the polymer is present in an amount by weight percent of total composition; that is:

(a) more than zero but less than about 4 wt %, preferably from about 2 to about 3 wt % of total composition for sulfonated EPDM, or (b) from about 2 to about 7 wt % of total composition for acrylic acid terpolymers or sulfonated styrene butadiene, and wherein the neutral mixture or blend contains cations of the basic neutralizing agent having a valence from +1 to +3, specifically +1, +2 and +3. More particularly, the neutralizing agent may be selected from the group consisting of amines, ammonia, and bases that contain cations selected from the group consisting of Groups IA, IIA, IIIA and Groups IB through VIIB of the Periodic Table and mixtures thereof. The term "EPDM" is used as defined in ASTM D-1418; "acrylic acid terpolymers" means terpolymers of ethylene, vinyl acetates or alkyl acrylates and from 1 to 6% acrylic acid as a co-monomer having a melt index of about 1 to about 5; and "sulfonated styrene-butadiene" means sulfonated styrene-butadiene linear diblock and sulfonated styrene-butadiene-styrene linear and radial triblock copolymers, which copolymers are not hydrogenated. This invention requires the asphaltic compositions to demonstrate improved phase compatibility of the neutral blend of oxidized asphalt and acid functionalized polymer and be storage stable, i.e. the compositions must be neutral blends of asphalt and polymer as a continuous phase or two continuous phases (i.e., at least one continuous phase) that are substantially uniformly interdispersed (i.e. dispersed throughout each other) and do not segregate under the conditions typically associated with the production and use of road paving materials or measurement of storage stability. Further, they must have variations in softening points between the top and bottom of a sample of the blend stored at elevated temperature of not greater than 4° C. Oxidation is accomplished by means of airblowing. The terms asphalt and bitumen are used interchangeably herein. This invention also relates to a method for making and using the compositions, and includes the products produced by the process disclosed herein.

DETAILED DESCRIPTION OF THE INVENTION

Asphalt is a bituminous material remaining after, or prepared from, the distillation of crude oil. Typically, asphalt is derived from the bottoms of a vacuum distillation tower and has an atmospheric equivalent boiling point of generally at least 350° C. Because it is hydrophobic and has good adhesiveness and weatherability, asphalt can be used as an adhesive or binder component of road paving materials. When so used, asphalt is normally mixed with aggregate (i .e., rock), typically in a ratio of about 5 wt % asphalt to 95 wt % aggregate. The compositions of the present invention are also useful as binders, as is asphalt, but show improved properties as disclosed herein.

In order to be suitable as a binder in open graded or dense graded pavement, a polymer-modified asphalt must have certain characteristics. It must be liquid-like on application, but harden on cooling, be able to resist rutting, cracking and stripping and should be storage stable as a hot fluid. In order to achieve the necessary liquid-like properties, the polymer-modified asphalt must have a lower range of viscosities and softening points than is needed in certain other applications such as roofing materials. Viscosities in the range of from about 150 to 2000 cPs at 135° C. for dense graded, and from about 3000 to 8000 cPs at 135° C. for open graded pavement binders are required in the compositions of the present invention. Softening points in the range of greater than about 55° C. to about 65° C. as a binder for dense graded and from about 60° C. to about 75° C. as a binder for open graded pavement are preferred.

The asphalts used in the present invention may be obtained from a variety of petroleum residua and may be classified by their penetration (measured according to Standard Specification ASTM D-5). Typically, the asphalt will have a nominal atmospheric boiling point at least 350° C. and more typically above 440° C. However, asphalts having high asphaltene content (such as gilsonite) are not desirable starting materials as asphaltenes are known to adversely affect the storage stability of polymer-modified asphaltic compositions used in road paving. Similarly, starting asphalts should not have softening points above about 55° C.

While addition of polymers can impart the needed viscoelastic properties to the material, the type of polymer and the manner in which the asphalt and polymer are modified also can influence the compatibility between asphalt and polymer and storage stability of the resulting asphaltic composition. It is economically very desirable that the asphaltic composition be storage stable and, thus, not segregate into its constituent phases or layers of asphalt and polymer if it is to be used as a binder in road paving materials. A disadvantage of blends which are not storage stable at elevated temperatures is that the polymer and asphalt phase segregate and become unusable, particularly after standing at elevated temperatures for long periods.

One embodiment of the present invention, described below, is processes for making the novel asphaltic compositions. Another embodiment is the compositions themselves, including the products produced by the processes described herein.

Thus, the road paving binder compositions of the present invention exhibit improved viscoelastic properties and phase compatibility, and thus storage stability. Unexpectedly it has been found that normally incompatible asphalts and polymers can be made into compatible blends, that is blends that contain one continuous phase or two continuous phases that are substantially uniformly interdispersed (i.e. dispersed throughout each other) which do not segregate on standing under conditions normally associated with the production, use and storage of paving binders, and at which storage stability is typically measured.

In the compositions of the present invention it is essential that the polymer and asphalt phases do not {phase) segregate significantly into an asphalt phase and a polymer phase but rather that they remain (inter)dispersed in the blend on standing at the elevated temperatures at which paving binder compositions and road paving materials are typically made and used or at which storage stability is typically measured. Substantial uniformity means a distribution that effectively maintains the asphalt and polymer phases without segregation (or with insubstantial segregation) as measured herein.

The phase behavior of polymer asphalt blends is complex. A polymer asphalt blend may be one or two phases. One phase systems result when polymer is dissolved in asphalt. Many polymer asphalt blends form two phase systems ("phase separation"); one phase is mostly polymer and/or polymer swollen with asphalt, the other phase is mostly or entirely asphalt. Typically, one (first phase) or the other (a second) phase is continuous. In one such case, discrete polymer particles are dispersed in asphalt, in another asphalt may be dispersed in polymer, in yet a third case both polymer and asphalt phases are continuous.

Storage stability means that the phases do not phase segregate on standing for a specified period of time, usually 3–5 days at a specified (elevated) temperature, usually 160° C. In the blends of the present invention it is required that the asphalt and polymer phase remain (inter)dispersed throughout the blend, as measured by the softening points of samples taken of the top third and bottom third of a sample of the blend stored at elevated temperatures. Softening point variations of equal to or less than 4° C. indicate phase compatibility (i.e., insubstantial or no phase segregation) and, thus a storage stable blend. Generally in a system or blend that is phase segregated, the system tends to form layers such that the phase into which the polymer segregates typically shows a significantly higher softening point than that of the asphalt phase (which is thus substantially depleted of polymer). The storage stable asphalt-polymer blends of the present invention will not {or will not substantially) phase segregate. Rather, the asphalt, polymer and neutralizing agent are present in amounts that are effective to allow the formation of one continuous phase or two interdispersed phases that do not segregate on standing at elevated temperatures.

Many claims of storage stability have been made in the prior art. These claims, however, are based on a relatively narrow difference between the softening points of samples taken from the top third and bottom third of the blend (using standard ring and ball tests). Applicants have found, however, that small differences of softening points between the top and bottom third of the samples of the blend do not always adequately define storage stability. Thus, a narrow temperature difference may exist and yet phase segregation (the essential antithesis of storage stability) may be present. For example, the top portion of the blend can have a continuous polymer phase with asphalt dispersed therein while the bottom portion has a continuous asphalt phase with polymer dispersed therein, even though the softening points are within the required range. Such a situation does not provide storage stability in the sense of this invention. Nevertheless, by the practice of this invention, the continuous phase at any point in the blend is always the same. That is, for true storage stability the top portion of the blend will have the same continuous phase as the bottom portion. Now, for the sake of completeness, a storage stable blend must satisfy two criteria, that of phase compatibility and softening point variation, as follows: Phase compatibility occurs if asphalt is continuous top and bottom with polymer dispersed therein; or polymer is continuous top and bottom with asphalt dispersed therein; or both polymer and asphalt are continuous top and bottom with asphalt and polymer each dispersed in the other; and also wherein the softening point measured by ring and ball test of a sample from the top third of the blend does not differ by more than 4° C. from the softening point of a sample from the bottom third of the blend.

As used herein phase segregation and segregation mean that asphalt and polymer phases do not remain uniformly (inter)dispersed top through bottom of the blend. This was demonstrated when the top and bottom thirds of a sample of the blend had different continuous phases (e.g., the top continuous phase was polymer with or without asphalt interdispersed, and the bottom was asphalt with or without polymer interdispersed).

Included in the present invention are blends meeting the further requirements contained herein wherein the top and bottom samples of the blends contained: one continuous asphalt phase with polymer (inter)dispersed; or one continuous polymer phase with asphalt dispersed therein; or two phases of continuous asphalt and polymer dispersed therein, wherein softening point temperature variation between top and bottom is less than or equal to about 4° C. Expressed otherwise, the variation must meet the formula $(b-a)/(t-a) > 0.7$ to about 1.0, preferably $>0.8$ to about 1.0. As used herein "b" is the softening point of the bottom third of the sample of the blend held for four days at 160° C., "t" is the softening point of the top third of the sample under the same conditions, and "a" is the softening point of the original starting asphalt (i.e., without polymer added). Softening points are typically measured by standard ring and ball tests (as ASTM D36) which are readily known to those skilled in the art. Softening points are iso-viscous temperatures, i.e., the temperatures at which all samples have the same viscosity.

The novel compositions can be produced by the process of the present invention, which includes combining an effective amount of a basic neutralizing agent, an oxidized asphalt, and an acid functionalized polymer corresponding to an amount sufficient to result in a road paving asphaltic binder composition having a viscosity within the range disclosed above and properties as disclosed herein and wherein the asphalt and polymer form a compatible blend that does not phase segregate under the conditions herein described. Phase separation of the asphalt and polymer, to the extent it occurs, should not result in substantial physical segregation of the asphalt and polymer in the blend. The polymer is selected from the group consisting of sulfonated EPDM, sulfonated unhydrogenated styrene-butadienes, and acrylic acid terpolymers, and wherein the polymer is present in an effective amount by weight percent of total composition less than or equal to about 7 wt %. If the polymer is sulfonated EPDM the weight percent of polymer is required to be an effective amount that is greater than zero and less than about 4 wt %, and preferably 2–3 wt %. If the polymer is selected from the group consisting of sulfonated styrene butadienes and acrylic acid terpolymers the weight percent of polymer is required to be an effective amount that is from about 2 wt % to about 7 wt %, preferably from about 3 wt % to about 5 wt %. When the polymer is an acrylic acid terpolymer, the polymer contains ethylene and acrylic acid monomers and co-monomers selected from the group consisting of vinyl acetates, alkyl acrylates and/or mixtures thereof.

In the case of sulfonated polymers, sulfonation should be accomplished prior to combining with the oxidized asphalt and should be at an effective level of up to about 100 meq $SO_3H$/100 g polymer to minimize water swellability or dispersibility of the resulting composition. Sulfonated unhydrogenated styrene-butadiene and styrene-butadiene-styrene polymers should contain less than 1 wt %, preferably 0.22–0.8 wt % bound sulfur. Sulfonation may be performed by any means known to one skilled in the art. For example, sulfonation may be accomplished using sulfuric acid or, more preferably, acyl sulfates. Thereafter the sulfonated polymers are neutralized.

In the process of the present invention, the asphalt is oxidized by airblowing in any manner known to one skilled in the art. Oxidation is carried out at a temperature ranging from about 180° C. to 300° C.; more preferably, from about 200° C. to about 250° C. for about 3 hours to about 12 hours for commercial processes. Generally, the procedure followed is to oxidize the asphalt to a pre-selected softening point, usually greater than 100° C., and a relatively high viscosity, then blend in flux, which may be the original asphalt or other asphaltic material, to decrease the viscosity into the target range desired. Selection of the desired final viscosity is generally based on experience and is within the skill of a routineer in the art, given the ranges disclosed in the present invention. The term "oxidized asphalt" in this disclosure and in the claims of this invention means any blend of oxidized and unoxidized asphalts so prepared and as defined above.

In the process of making the novel asphaltic compositions, the oxidized asphalt and acid functionalized polymer mixture may be combined using any number of methods known to one skilled in the art. These may include dissolution with stirring in a suitable solvent such as dichloroethane for the asphalt and toluene for the polymer, or heating the oxidized asphalt to about 140° C. to 200° C., typically 140° C. to 190° C. and thereafter adding the polymer in situ in portions with stirring or agitation, the latter preferably using a high shear mixing device. The method used will influence the amount of time needed to combine the oxidized asphalt and polymer, but in any event should be sufficient to distribute or disperse the polymer throughout the asphalt. Times may range from ½ to 24 hours, according to the method used.

The basic neutralizing agent contains cations having a valence from +1 to +3 specifically +1,+2 and +3, and may be selected from the group consisting of ammonia, amines, bases that contain cations selected from the group consisting of Groups IA, IIA, IIIA, and Groups IB through VIIB of the Periodic Table and mixtures thereof. The preferred basic neutralizing agent is one that contains one or more monovalent or divalent cations, preferably divalent cations. These may preferably be $Zn^{+2}$, $Ca^{+2}$, $Ba^{+2}$, $Mg^{+2}$ and mixtures thereof, or more preferably $Zn^{+2}$ and $Ca^{+2}$. Suitable compounds containing such cations are, for example, zinc acetate, zinc oxide or calcium oxide, more preferably calcium oxide. The basic neutralizing agent may be contained in a suitable solvent, such as water/methanol before adding to the oxidized asphalt-polymer mixture, or may be added in situ, for example, in powdered or other undissolved form. The order of neutralization is not important. Thus, for example, the polymer may be neutralized and then combined with the oxidized asphalt or the oxidized asphalt and acid functionalized polymer may be combined and then neutralized. Preferred for acrylic acid terpolymers is the addition of basic neutralizing agent in situ directly to the heated oxidized asphalt or to oxidized asphalt-acid functionalized polymer mixture. It is necessary that sufficient neutralizing agent be added to neutralize acid groups on the polymer or to effect ion exchange. Generally this will require a stoichiometric amount or, preferably a slight excess of neutralizing agent.

It is possible to adjust the softening point and viscosity of the asphaltic composition by varying the amount of oxidized asphalt polymer in the composition. However, it is a requirement of the present invention that the resulting asphalt-polymer compositions have a viscosity in the range from about 150 to about 2000 cPs for binders for dense graded pavement and from about 3000 to about 8000 cPs for binders for open graded asphalt pavement, measured at 135° C. Hence, the weight percent of polymer in comparison to the weight percent of the total composition must be adjusted accordingly. At all times the amount of polymer will be an effective amount less than 7 wt %. However, in the case of sulfonated EPDM the weight percent of polymer in the composition is required to be greater than zero to less than about 4 wt %, preferably from about 2 to about 3 wt %; in the case of sulfonated styrene butadiene and acrylic acid terpolymers the weight percent is required to be from about 2 to about 7 wt %, preferably from about 3 wt % to about 5 wt %. It is at these amounts that the polymer modified asphaltic compositions possess the necessary viscoelastic character to allow their use as a binder in open graded and dense graded road paving materials, while showing the storage stability characteristic of the materials of this invention.

In the present invention, softening point was used as one measure of compatibility and storage stability. If the top third and bottom third of a sample stored at 160° C. for 4 days showed softening points within about a 4° C. variation, the asphalt and polymer were judged compatible. However, in order to supplement the softening point data optical micrographs were taken of the top and bottom segments of the asphaltic compositions to verify phase stability and compatibility.

Unexpectedly, it has been found that, compared with untreated asphalt or functionalized airblown asphalt alone, the base neutralized compositions of the present invention form compatible blends of asphalt and polymer in the presence of the neutralizing agent and do not phase segregate and thus remain storage stable after holding for example, for four days at 160° C. Expressed otherwise, the variation must meet the formula $(b-a)/(t-a) \geq 0.7$ to about 1.0, preferably $\geq 0.8$ to about 1.0 wherein a, b and t are as defined previously. The blends have improved viscoelastic properties and softening points and have viscosities that are within the targets required for the particular binders disclosed herein.

The novel binder compositions of the present invention may be used to form paving compositions containing aggregate or rock and the novel binders disclosed herein to form paving compositions having improved properties. Of particular note, in addition to the superior characteristics associated with the binder composition, is the improvement in antistripping of paving compositions. To form the paving compositions the novel binders may be combined with aggregate or rock in effective amounts by any suitable means known to one skilled in the art. Aggregate is known to those skilled in the art, and suitably is any particulate material used in road paving applications for combination with binder. Any suitable material, typically, locally available materials may be used, e.g., rock, stone granite, shells or other suitable high modulus materials. Examples of materials and methods of combining binder, asphalt and aggregate may be found in *The Asphalt Handbook* pp. 81–112 (1989) and Hot Mix Asphalt Materials, Mixture Design and Construction pp. 85–135 (1991). When paving compositions using the novel binders are made, the process includes forming the binder having the required characteristics of phase compatibility and, thus storage stability, as well as softening point variation and superior viscoelastic properties described above according to the methods disclosed above, and mixing the binder with aggregate or rock to form the road paving composition, which paving material may be applied to a paving surface according to methods and under conditions known to those skilled in the art to be effective to produce a road paving surface.

The present invention may suitably comprise, consist or consist essentially of the elements disclosed herein.

The invention is illustrated by reference to the following examples, which are not intended to limit the scope of the invention.

EXAMPLE 1

Oxidation was accomplished by heating the asphalt (asphalt is a Billings asphalt of penetration grade 120/150) to 200° C. with stirring for 2 hours and by passing air through the asphalt with an inlet at the bottom of the flask. The effect of airblowing on softening points and viscosities is shown in the table below (Samples (B) through (G)). After the 2 hour oxidation period, the asphalt (360.2 g) was cooled to 150°–160° C., and 7.2 g of polymer (an ethylene methyl acrylate-acrylic acid terpolymer, containing 1% acrylic acid and 23% methyl acrylate, melt index equal to 5) was added with stirring and the stirring continued for about 1 hour. The neutralizing agent (3.85 g of zinc oxide) was added and the mixture stirred an additional hour. The data below indicate that the polymer-asphalt blends' softening points and viscosities are improved over the starting asphalt, and that storage stability is achieved for the oxidized asphalt-terpolymer blend only when neutralizing agents are added.

In microscopic examination of the top one third ("T") and bottom one third ("B") portion of each sample, it was found that Samples D and E contained similar amounts of polymer. Samples C and F had significantly more polymer in the top phase than in the bottom. Sample (G) showed slightly more polymer in top than in the bottom sample but still remained within the range of compatible blends.

TABLE

| Sample | Polymer (wt %) | Neutralizing Agent | Initial Softening Point[1] °F. (°C.) | Viscosity[2] cP, 135° C. | Softening Point, °F.[1] Top | Bottom |
|---|---|---|---|---|---|---|
| (A) | 0 | None | 107 (42) | 257 | * | * |
| (B) | 0 | None | 117 (47) | 450 | * | * |
| (C) | 2 | None | 125 (52) | 654 | 132 | 126 |
| (D) | 2 | ZnO | 127 (53) | 673 | 130 | 129 |
| (E) | 2 | CaO | 128 (53) | 720 | 132 | 132 |
| (F) | 4 | None | 131 (55) | 1060 | 137 | 131 |
| (G) | 4 | CaO | 135 (57) | 1262 | 138 | 135 |

Legend
The viscosity for the asphalt-polymer compositions of the present invention must fall within the target range of from about 150 cP to 2000 cP and from about 3000 cP to about 8000 cP at 135° C. Samples (D), (E), and (G) formed compatible blends, based on softening point data and optical microscopy. Blends (C) and (F) were shown to be phase-separated by optical microscopy.
(A) Starting asphalt unoxidized
(B) through (G) Oxidized Sample (A)
(1) ASTM D36 standard test method for softening point of asphalt ring-and-ball apparatus.
(2) ASTM D4402 standard test method for viscosity of unfilled asphalts using the Brookfield thermosel apparatus.
*Not measured

EXAMPLE 2

An unoxidized asphalt (Baytown AC-10) was blended with a commercially prepared airblown coating grade of asphalt ("coating grade" as used herein means highly oxidized asphalt having a softening point of at least 205° F. (96° C.)). Coating grade was prepared from Tia Juana Medium residuum. In this example, Zn-sulfonated EPDM was used to compare an air oxidized asphalt prepared as in Example 1, with an asphalt prepared by blending an unoxidized asphalt (Sample A) with an airblown coating grade. In this example, 20 wt % of the coating grade material was blended at 160° C. with 80 wt % of unoxidized asphalt.

TABLE

| Sample | Polymer (wt %) | Neutralizing Agent | Initial Softening Pt °F. (°C.) | Viscosity cP, 135° C. | Softening Point, °F. Top | Bottom |
|---|---|---|---|---|---|---|
| (A) | 0 | None | 107 (42) | 278 | * | * |
| (B) | 0 | None | 122 (50) | 514 | * | * |
| (C) | 1 | CaO | 129 (54) | 918 | 127 | 128 |
| (D) | 0 | None | 116 (47) | 421 | * | * |
| (E) | 1 | CaO | 123 (51) | 1034 | 128 | 133 |

Legend
The target range of viscosity is from about 150 to 2000 cP and from about 3000 to about 8000 cP (for dense graded and open graded binder, respectively) for asphaltic compositions of the present inventions. Samples (C) and (E) formed compatible blends, as confirmed by optical microscopy.
*Not measured
(A) Starting asphalt
(B) Oxidized Sample (A)
(C) Oxidized Sample (A)
(D) 80% Sample (A) + 20% coating grade asphalt
(E) 80% Sample (A) + 20% coating grade asphalt
Softening points and viscosities were measured as in Example 1.

EXAMPLE 3

A Zn-sulfonated EPDM (the polymer was separately neutralized) was mixed with a coating grade asphalt at 160° C. (320° F.). Properties of this blend (Sample C) are shown in the table below and are seen to be too high in softening point and viscosity to be useful in asphalt binder applications. Coating grade was prepared from Tia Juana Medium residuum. Unoxidized asphalt (Baytown AC-5) was blended back to the coating grade-polymer blend to adjust the properties into the target range. Data in the table below indicate that this is effective. All blending was done at 160° C. (320° F.) although temperatures below that can be used in providing the blends are low enough in viscosity to allow good mixing.

TABLE

| Sample | Polymer (wt %) | Initial Softening Pt °F. (°C.) | Viscosity cP, 135° C. |
|---|---|---|---|
| (A) | 0 | 102 (39) | 260 (approx.) |
| (B) | 0 | 205 (96) | 14000 |
| (C) | 4 | 263 (128) | 24425 |
| (D) | 3.2[a] | 232 (111) | 4250 (at 350° F.; 177° C.) |
| (E) | 2[a] | 169 (76) | 5125 |
| (F) | 1.5[a] | 154 (68) | 3260 |

Legend
The target range of viscosities for asphaltic compositions of the present invention is from about 150 to 2000 cP and from about 3000 to about 8000 cP for dense graded and open graded binder, respectively, measured at 135° C. Samples D, E, and F were all storage stable.
(A) Starting asphalt
(B) Coating grade asphalt
(C) Coating grade asphalt + polymer
(D) 20% starting asphalt + 80% coating grade asphalt-polymer blend produced in (C)
(E) 50% starting asphalt + 50% coating grade asphalt-polymer blend produced in (C)
(F) 63% starting asphalt + 37% coating grade-polymer blend produced in (C)
Softening points and viscosities were measured as in Example 1.
[a]Calculated

EXAMPLE 4

A feedstock was prepared by blending 20 wt % of an airblown coating grade asphalt (softening point 195° F.; viscosity 12,580 cP at 275° F. (135° C.) with 80% of an unoxidized asphalt (AC-3) (softening point 61° F. (16° C.); viscosity 70 cP at 275° F. (135° C.). Coating grade was prepared from Tia Juana Medium residuum. Unoxidized asphalt was prepared from a blend of naphthenic crude oil residua. The resulting 80/20 blend had a softening point of 117° F. (47° C.) and a viscosity of 388 cP at 275° F. {135° C.). To 376.8 g of this 80/20 blend, heated at 320° F. (160° C.), 11.3 g of a sulfonated zinc neutralized styrene-butadiene-styrene triblock radial copolymer was added, and the mixture was stirred for 2 hours. The resulting polymer-asphalt blend had a softening point of 153° F. (67° C.) and a viscosity of 1042 cP at 275° F. (135° C.). It was storage stable after 4 days at 160° C., having a bottom and top softening point of 164° F. (73° C.) and 165° F. (74° C.), respectively. The storage stability was also confirmed by optical microscopy. In another vessel, 338 g of the 80/20 blend was heated to 320° F. (160° C.) and 10.15 g of a sulfonated zinc neutralized styrene-butadiene diblock copolymer was added, and the mixture stirred for 2 hours. The resulting polymer modified asphalt had a softening point of 135° F. (57° C.) and a viscosity of 1074 cP at 275° F. (135° C.). It was storage stable after 4 days at 160° C. (both top and bottom samples had softening points of 140° F. (60° C.), and the storage stability was confirmed by optical microscopy. Other blends were made with the same 80/20 asphalt feed and the same amounts of unsulfonated polymers. These blends were not storage stable, having bottom and top softening points of 130° and 212° F., respectively, for the SBS blend and 141° and 129° F., respectively, for the SB blend.

Similar experiments were carried out using an air oxidized Baytown AC-10 asphalt prepared as described in Example 1. Data are shown in the table below. Softening points and viscosities were measured as in Example 1.

TABLE

| Sample | Polymer | Softening Point °F. (°C.) | Viscosity 135° C. | Softening Point, °F. Bottom | Top |
|---|---|---|---|---|---|
| (AC-10) Bitumen | None | 107 (42) | 278 | — | — |
| Air Oxidized | None | 127 (53) | 638 | — | — |
| Air Oxidized | 2% Zn Sulfo-SBS | 128 (53) | 832 | 126 | 127 |
| Air Oxidized | 2% Zn Sulfo-SB | 144 (62) | 1806 | 142 | 142 |
| Air Oxidized | 4% Zn Sulfo-SB | 153 (67) | 3610 | 154 | 154 |

EXAMPLE 5

Another blend of 20% coating grade and 80% of unoxidized Tia Juana Medium asphalt was prepared. Coating grade was prepared from Tia Juana Medium residuum. It had a softening point and viscosity as shown in the table below. 3 wt % of a zinc neutralized sulfonated SBS radial triblock copolymer was added to this blend. In another blend 3 wt % of the unsulfonated SBS was added. Data below indicate the necessity of having a sulfonated SBS radial triblock copolymer. Softening points and viscosities were measured as in Example 1.

TABLE

| Polymer | Initial Softening Pt. °F. (°C.) | Viscosity 135° C. | Softening Pt, °F. Bottom | Top |
|---|---|---|---|---|
| None | 115 | 408 | | |
| 3% SBS | 140 (60) | 2465 | 135 | 210 |
| 3% ZnSulfo SBS | 158 (70) | 3355 | 163 | 165 |

We claim:

1. A road paving binder composition, which comprises a base neutralized blend of an oxidized asphalt, and a polymer selected from the group consisting of sulfonated EPDM, sulfonated styrene-butadiene linear diblock and sulfonated styrene-butadiene-styrene linear and radial triblock copolymers, wherein the polymer is present in an amount by weight percent of total composition that is sufficient for the blend to have a softening point greater than about 55° C. and a viscosity in the range from about 150 cPs to about 2000 cPs or from about 3000 cPs to about 8000 cPs measured at 135° C., and wherein said amount of polymer is less than about 4 wt % when the polymer is sulfonated EPDM and wherein said amount of polymer is from about 2 wt % to about 7 wt % when the polymer is selected from the group consisting of sulfonated styrene-butadiene linear diblock and sulfonated styrene-butadiene-styrene linear and radial triblock copolymers, and wherein the blend has asphalt and polymer interdispersed in at least one continuous phase such that the blend is storage stable and substantially phase compatible having a softening point variation between a sample of the top third and bottom third of the blend stored at elevated temperature of equal to or less than about 4° C.

2. The composition of claim 1 wherein the polymer is sulfonated neutralized EPDM in an amount from about 2 wt % to about 3 wt % total composition.

3. The composition of claim 1 wherein the polymer is selected from the group consisting of sulfonated neutralized styrene-butadiene linear diblock, styrene-butadiene-styrene linear and styrene-butadiene-styrene radial copolymers in an amount from about 3 wt % to about 5 wt % composition.

4. The composition of claim 1 wherein the base neutralized blend contains cations having a valence of from +1 to +3.

5. The composition of claim 1 wherein the base neutralized blend contains cations selected from the group consisting of $Ca^{+2}$, $Zn^{+2}$, $Ba^{+2}$, $Mg^{+2}$, and mixtures thereof.

6. The composition of claim 1 wherein the continuous phase at any point of the blend is the same.

7. The composition of claim 1 wherein the continuous phase is polymer.

8. The composition of claim 1 wherein the continuous phase is asphalt.

9. The composition of claim 1 wherein the continuous phase is polymer and asphalt.

10. A method of preparing a road paving composition, comprising combining at a temperature of from about 140° C. to about 250° C., a basic neutralizing agent, an oxidized asphalt and a polymer selected from the group consisting of sulfonated EPDM, sulfonated styrene-butadiene linear diblock and sulfonated styrene-butadiene-styrene linear and radial triblock polymers wherein the polymer is present in an amount by weight of total composition that is sufficient to result in a softening point greater than about 55° C. and a viscosity in the range of from about 150 cPs to about 2000 cPs or from about 3000 CPs to about 8000 cPs measured at 135° C., wherein said amount of polymer is less than about 4 wt % when the polymer is sulfonated EPDM, and wherein said amount of polymer is from about 2 wt % to about 7 wt % when the polymer is selected from the group consisting of sulfonated styrene-butadiene linear diblock and sulfonated styrene-butadiene-styrene linear and radial triblock copolymers, to form a neutral blend of asphalt and polymer, having the asphalt and polymer interdispersed in at least one continuous phase such that the blend is storage stable and substantially phase compatible having a variation in softening point between a sample of the top third and bottom third of the blend stored at elevated temperature of equal to or less than about 4° C.

11. The method of claim 6 wherein the polymer is first neutralized, and then combined with the oxidized asphalt.

* * * * *